United States Patent [19]
Betterton et al.

[11] Patent Number: 5,089,675
[45] Date of Patent: Feb. 18, 1992

[54] RESISTOR CARD CALIBRATION RETENTION METHOD AND FUEL PUMP SWITCH

[75] Inventors: Joseph T. Betterton, Arab; Alfred H. Glover, Decatur; Thomas S. McKee, Madison, all of Ala.

[73] Assignee: Acustar, Inc., Troy, Mich.

[21] Appl. No.: 500,966

[22] Filed: Mar. 29, 1990

[51] Int. Cl.⁵ .................... H01H 35/34; G01L 7/08
[52] U.S. Cl. ........................ 20/83 J; 73/725; 200/82 R; 338/42
[58] Field of Search ............ 200/82 R, 83 J; 338/36, 338/39, 42; 73/725, 744, 753, 756; 29/622

[56] References Cited

U.S. PATENT DOCUMENTS

| | | | |
|---|---|---|---|
| 3,321,594 | 5/1967 | Reise et al. | 200/83 V |
| 3,504,324 | 3/1970 | Creager | 338/42 |
| 4,255,630 | 3/1981 | Hire et al. | 200/81.4 |
| 4,449,112 | 5/1984 | Gould | 338/39 |
| 4,452,202 | 6/1984 | Meyer | 123/494 |
| 4,524,255 | 6/1985 | Haag | 200/83 R |
| 4,581,941 | 4/1986 | Obermann et al. | 73/728 |
| 4,630,480 | 12/1986 | Betterton et al. | 73/756 X |
| 4,767,897 | 8/1988 | Betterton et al. | 200/83 J |
| 4,778,956 | 10/1988 | Betterton et al. | 200/83 J |
| 4,805,460 | 2/1989 | Betterton et al. | 73/725 |
| 4,967,047 | 10/1990 | Betterton et al. | 200/83 J |
| 5,004,996 | 4/1991 | Shibazaki et al. | 338/36 |

Primary Examiner—J. R. Scott
Attorney, Agent, or Firm—Kenneth H. MacLean

[57] ABSTRACT

An improved pressure transducer having a switching device operated in response to changes in fluid pressure is disclosed which incorporates a terminal support member having electrical contacts which are designed to be electrically bonded to and mechanically interlocked with electrical contacts provided within the housing. The invention also includes an improvement in the piston contacts for preventing scratching of the resistor board. A method is provided for permanently connecting terminals of the housing with the mating metal connector terminals once they have been properly calibrated and connecting the housing ground strap with the terminal support member.

20 Claims, 3 Drawing Sheets

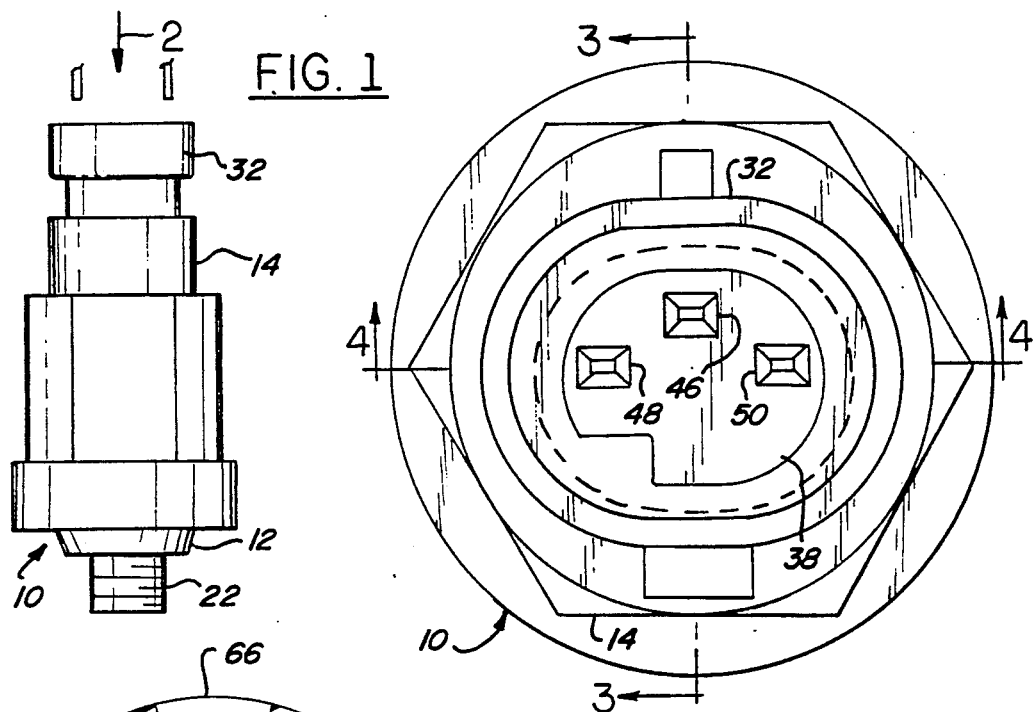
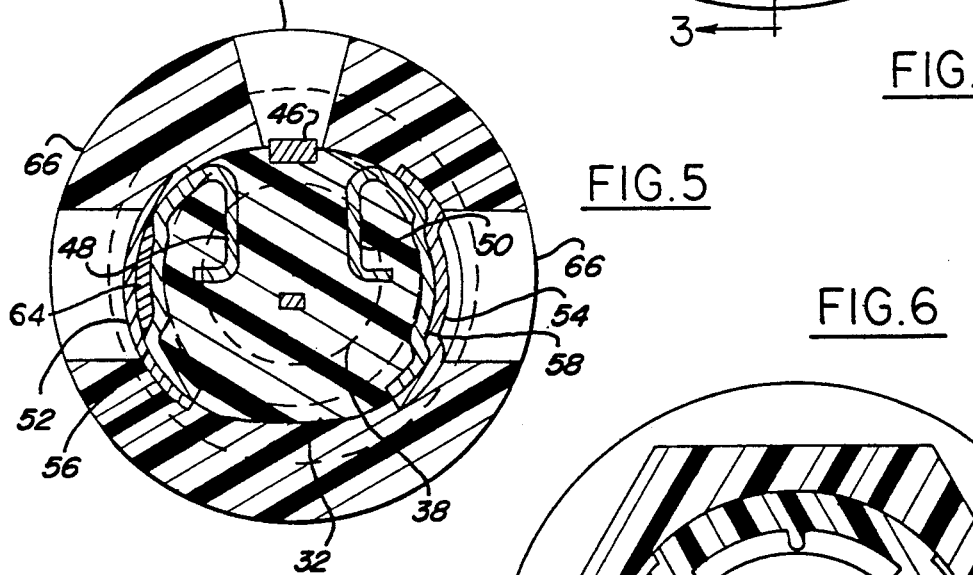
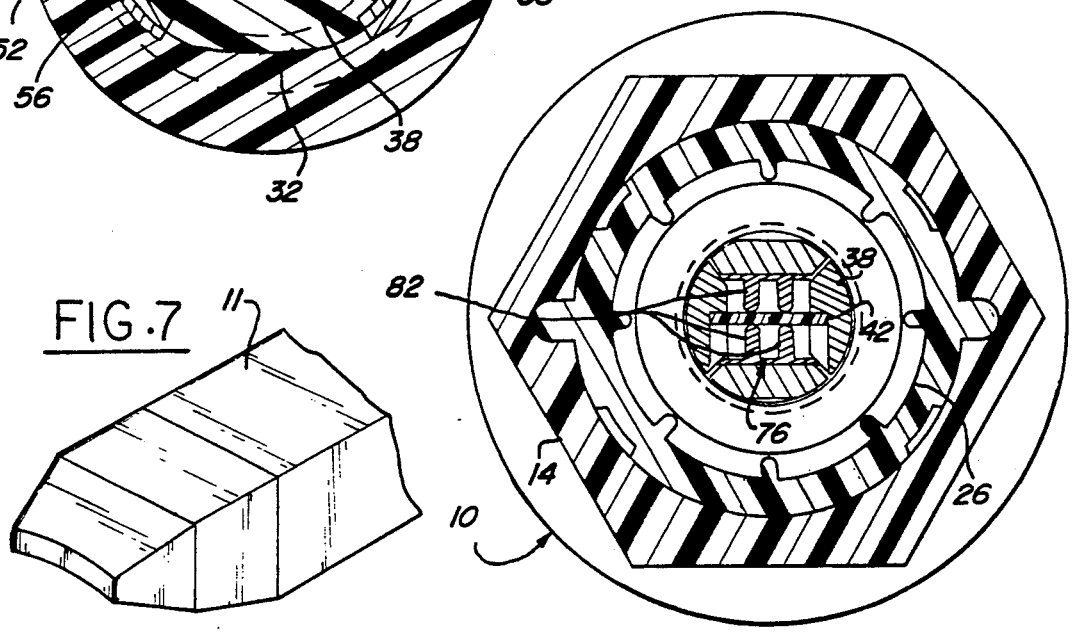

RESISTOR CARD CALIBRATION RETENTION METHOD AND FUEL PUMP SWITCH

BACKGROUND AND SUMMARY OF THE INVENTION

The present invention relates generally to a pressure transducer used with an internal combustion engine in an automobile, and more particularly, to a mini oil pressure transducer used to measure oil pressure and to produce a corresponding indicator signal.

Modern automobiles typically utilize a fuel injection system for the engine which includes an electric motor to power a fuel pump. In addition to providing an oil pressure indicating function, it is sometimes desirable to incorporate an electrical switch mechanism in an oil pressure transducer to control energization of the fuel pump in response to oil pressure. Specifically, it is desirable to activate the fuel pump motor only after a minimum oil pressure is reached.

A number of United States patents generally disclose a pressure transducer and switch mechanism, either singularly or in combination. For example, U.S. Pat. No. 3,321,594 to Reise, discloses a fluid pressure actuated switch with a diaphragm sensor operatively associated with electrical contacts for controlling an electric fuel pump motor. U.S. Pat. No. 4,255,630 to Hire, also discloses an electrical switch which is responsive to fluid pressure to control a fuel pump motor. U.S. Pat. No. 4,524,255 to Haag, discloses a switch with a movable diaphragm responsive to fluid pressure to open and close contacts of an electric circuit. U.S. Pat. No. 4,581,941 to Obermann, discloses a fluid pressure transducer including a switch therein, adapted to control a fuel pump motor and utilizes a diaphragm and contacts. U.S. Pat. No. 4,805,460 to Betterton, et al., discloses an oil pressure transducer with a piston assembly movable in response to pressure changes and extending to engage a switch.

Several other patents have been found which disclose pressure transducers without the switching device. These include U.S. Pat. Nos. 3,504,324; 4,449,112; and 4,452,202. All of the patents discussed or identified previously, broadly disclose a pressure transducer with or without a switching mechanism but do not specifically disclose the desirable features in the fluid pressure transducer with a switching device, as described hereinafter.

The subject pressure transducer and switch assembly incorporates desirable design features to better monitor and indicate fluid pressure. Specifically, the housing of the transducer forms an enclosure for a piston like member movable along with a diaphragm's mid-portion in response to pressure changes. The piston also carries an electrical contact bearing assembly which engages a resistor board supported by a separate terminal support member. The terminal support member is adjustably inserted into the transducer housing to an extent which determines the pressure indicating calibration and thus, the electrical indicating output.

Therefore, an object of the invention described and claimed in this application is to provide a simple, compact, inexpensive yet reliable fluid pressure responsive transducer having operative parts and assemblies which are conveniently assembled together and therefore, easily serviced and that are associated together in a manner which readily permits calibration of the transducer.

A further object of the present invention is to provide a method for securely fastening the terminals once they have been correctly calibrated. This method is designed to hold positive calibration for the life of the unit as well as make the electrical connections necessary for a properly functioning fuel pump switch.

A further object of the present invention is to provide a solder joint between the insert molded housing ground strap and the ground contact in the terminal support member. Previous transducers have used only a friction interface between the contacting surfaces allowing for possible corrosion which could break electrical contact.

A still further object of the present invention is to provide silver cadmium graphite laminated electrical contacting surfaces so as to enhance the useful life of the transducer.

A still further object of the present invention is to improve the piston contacts with the resistor card so that the piston contacts do not scratch the resistor card tracks. Other objects and advantages will become more apparent when viewed in light of the accompanying drawings and following detailed description.

DESCRIPTION OF THE DRAWINGS

FIG. 1 is an elevational view of the combination pressure transducer and switching assembly in accordance with the present invention;

FIG. 2 is an enlarged plan view of the transducer and switching assembly looking in the direction of arrow 2 shown in FIG. 1;

FIG. 5 is a section view of the assembly taken along section line 5—5 in FIG. 4;

FIG. 6 is a section view of the assembly taken along section line 6—6 in FIG. 4; and FIG. 7 is partial perspective view of the deformation tool.

DESCRIPTION OF A PREFERRED EMBODIMENT

In FIG. 1, the subject transducer and switch assembly 10 is illustrated. A detailed description of an assembly very similar to assembly 10 is found in related U.S. Pat. No. 4,767,897 issued Aug. 30, 1988, to Joseph T. Betterton, et al., the patent being specifically incorporated herein by reference.

Figure 3:
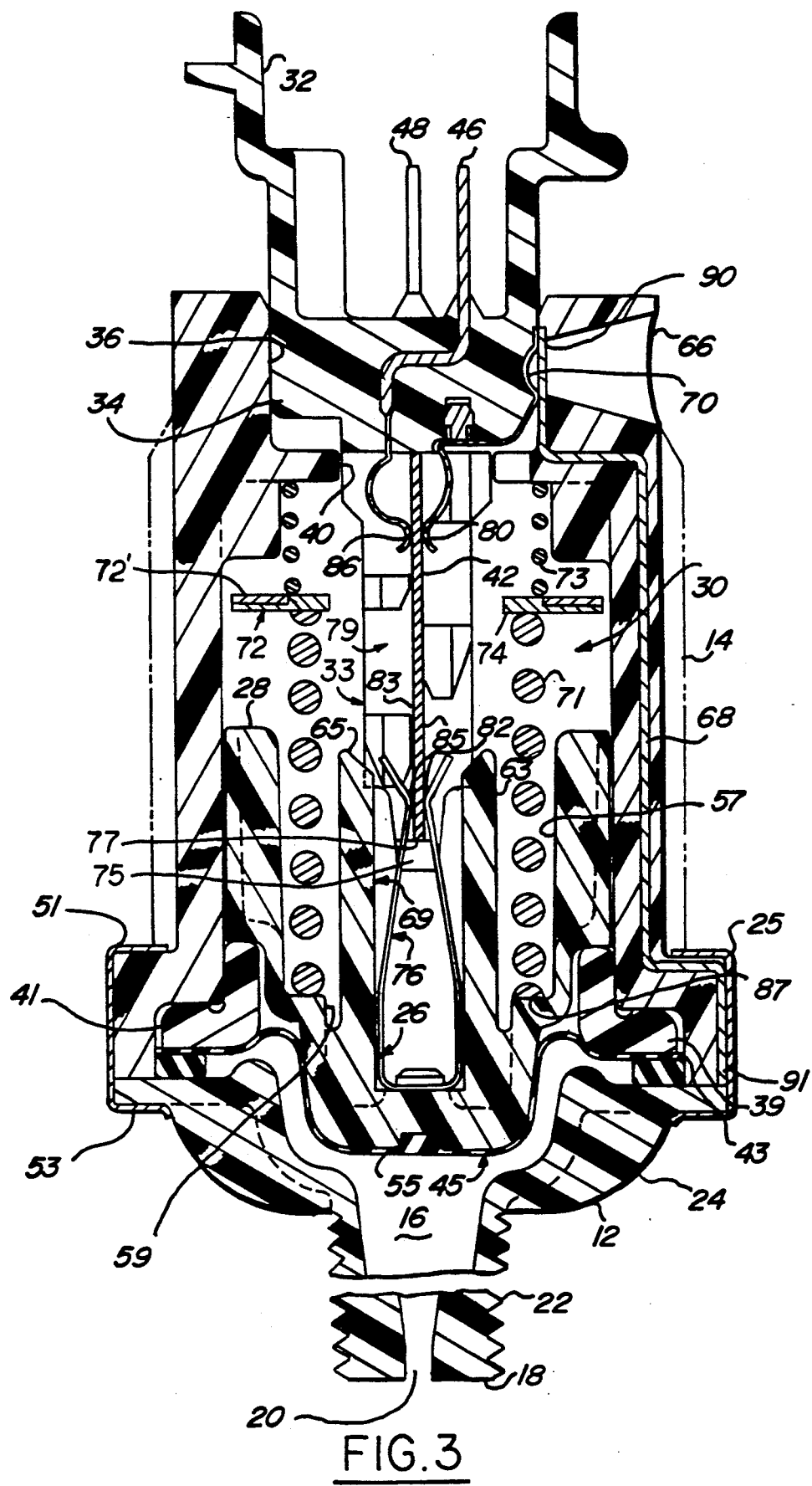
FIG. 3 is a section view of the assembly taken along section line 3—3 in FIG. 2.
Figure 4:
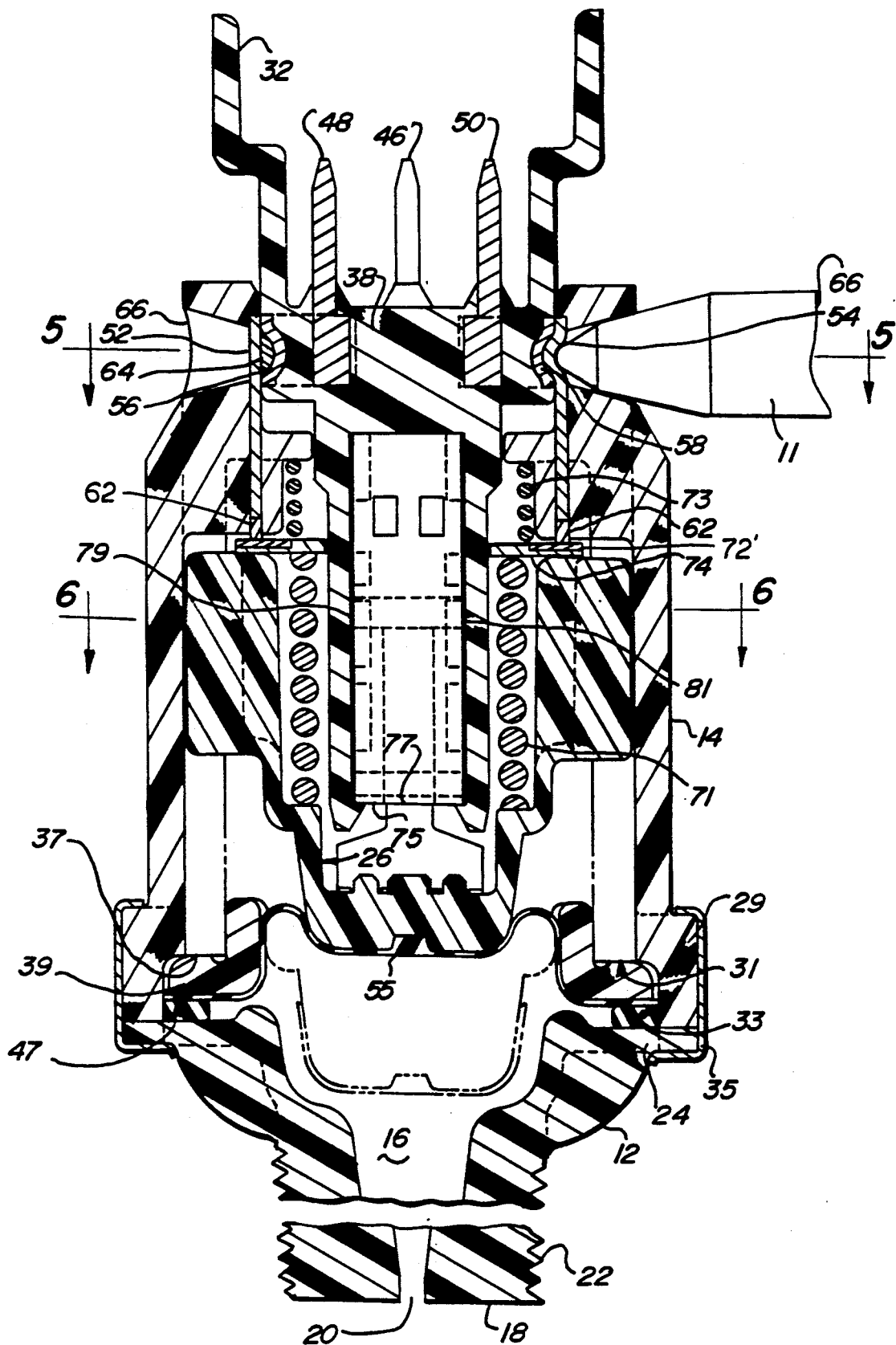
FIG. 4 is a section view of the assembly taken along section line 4—4 in FIG. 2, but showing the piston disposed therein in an axially shifted position from that shown in FIG. 3.

Assembly 10 includes two housing portions 12 and 14 also shown and in better detail in FIGS. 3 and 4. Specifically, housing portion 12 has a generally cup shaped configuration defining a generally hollow interior 16. It has an end portion 18 with a centrally positioned aperture or opening 20 therethrough. The housing 12 has a threaded cylindrical portion 22 which is adapted to attach assembly 10 to an automobile engine. Specifically, the portion 22 connects opening 20 to a pressurized oil lubrication passage of the engine. Resultantly, pressurized oil is admitted through opening 20 to the interior space 16. The upper end of the housing 12 includes a radially outwardly extending flange portion 24 for engagement with the other housing 14.

The housing 14 has a substantially tubular configuration, as seen from FIGS. 2-4. The outer surface configuration of housing 14 is preferably hexagonally shaped as shown in FIGS. 2 and 6 so that a tool may be applied to rotate the transducer during mounting on an engine. Referring now to FIG. 4, the lower end portion of housing 14 has a thickened and radially outwardly extending flange portion 29. The flange portion 29 of housing 14 defines an annularly configured recess 31 which includes sidewall 33. Outer edge portion 35 of member 12 abuts the end of flange portion 29.

The recess 31 in housing 14 defines a shoulder surface 37 for receiving an annular diaphragm securing or lock member 39 which abuts shoulder surface 37. Member 39 includes a radially outwardly located edge portion 41 which covers an outer peripheral edge portion 43 of a diaphragm member 45. The member 39 engages the diaphragm 45 and secures it against an O-ring 47 which lies on the flange 24 of housing member 12. The aforesaid parts, mainly member 39, peripheral edge 43 and flanged edge 24 are secured together and against shoulder 37 by an encircling retainer member or crimp ring 25 with bent or folded over edge portions 51 and 53, respectively.

The diaphragm 45 includes a mid-portion 55 which is exposed on one side to the oil in space 16. The mid-portion 55 is operatively connected at the other upper side to a piston member 26 which has a generally inverted cup shaped and tubular configuration. The piston member 26 includes a substantially cylindrical main body 28 adapted to be reciprocally received within an elongated bore 30 provided in housing 14. The position of the piston 26 shown in FIG. 3 corresponds to a relatively low or zero fluid pressure in interior space 16. Likewise, the position of the piston 26 shown in FIG. 4 corresponds to a high fluid pressure in interior space 16.

The interior of the tubular piston member 26 exhibits both a relatively large diameter dimension forming surface 57 and a smaller diameter dimension forming surface 59 nearest to the mid-portion 55. A pair of spaced posts or arms 63, 65 extend upwardly from the small diameter forming surface 59 to form a contact support member 69 as shown in FIG. 3.

The mid-portion 55, piston 26 and member 69 are biassed downward towards the low pressure position shown in FIG. 3 as opposed to the higher pressure position of FIG. 4 by means of a pair of coil springs 71 and 73. The springs 71 and 73 are compression type coil springs in series relation to one another.

A primary function of the pressure transducer 10 is to transmit an electrical signal or indicator corresponding to oil pressure levels sensed within the interior space 16 of housing 12. For passing this signal from the transducer 10, an electrical connector or terminal support member 32 is attached at the upper end of the housing 14 and is shown in FIG. 2. With reference to FIGS. 3 and 4, the terminal support member 32 has a generally cylindrically configured base portion 34 which is insertably received in a cylindrical recess 36 of housing 14. The base portion 34 is dimensioned with respect to the cylindrical recess 36 of housing 14 so that the terminal support member 32 may be axially moved in the recess 36. The clearance or fit between the terminal support member 32 and the recess 36 is preferably made very close so that a substantial force is required to move the terminal support member 32 to the desired axial location or calibration position. A central depending portion 38 of the terminal support member 32 extends through an opening 40 in the housing 14 into the interior of housing 14 and in an axial direction therethrough. The central portion 38 supports an elongated and flat resistor board 42 in a generally axial orientation within the interior of housing 14. A plurality of terminals 46, 48, 50 extend from the terminal support member 32.

As perhaps best shown in FIGS. 3 and 4, the depending portion 38 of member 32 includes a lower or bottom edge portion 75 which engages the bottom edge portion 77 of the resistor board 42. Also, the depending portion 38 is separated into left and right side portions 79, 81 to frame the sides of the resistor board 42.

As shown in FIGS. 3 and 6, these side portions 79, 81 and bottom edge 75 define a window. This window or access opening permits an electrical contact assembly 76 to slidingly engage grids 83 and 85. As shown in FIG. 6, the piston contact assembly 76 slidingly engages the resistor board 42. The contact assembly 76 has ends 82 which are formed into a compound radius to produce contact surfaces which are urged against the resistor board 42. The now smooth surface of the piston contacts 82 will not scratch the resistor card tracks or grids 83 and 85 as they slide along the resistor board 42. As oil pressure increases through the opening 20 it forces the piston 26 to move up axially within the housing 14 while the resistor board 42 is stationary. Resultantly, the contacts 82 slide along the board 42. The previously described relative movements change the electrical resistance between the terminals 46, 48, 50 and ground or the engine block to which the transducer 10 is mounted. This produces a variable electrical indicating signal corresponding to oil pressure levels.

With reference to FIGS. 3 and 4, the lower spring 71 is a compression type of coil spring which includes a spirally formed metal coil which extends upwardly from a flat surface 87 formed in the piston member 26. The upper end of spring 71 contacts an angularly shaped spring separator or washer 72 and specifically the inwardly extending portion 74 thereof. When the transducer is in the higher pressure functional position shown in FIG. 4, the spring 73 has been compressed till the washer 72 engages the lower ends 60, 62 of metal housing terminals 52, 54. Thereafter, spring 71 is compressed.

During the oil pressure measuring process, the pressure forces the oil on the diaphragm 45, moving the piston 26 and member 69 axially in the interior of housing 14 while the board 42 remains stationary. Resultantly, the contacts 82 of member 76 slide along the board 42 and specifically the grids 83 and 85. This relative movement changes the electrical resistance between the terminals and ground or the engine block to which the transducer 10 is mounted. This produces a variable electrical indicating signal corresponding to oil pressure levels. The transducer 10 is calibrated by moving the terminal support member 32 axially within recess 36 to a point where contact assembly 76 makes contact with the resistor board 42 at a location such that the indicating signal corresponds to zero oil pressure against the diaphragm 45 when the transducer 10 is as shown in FIG. 3. Terminal 46 is grounded through contact 86, contact 80 of ground contact 70, and the housing 12 through a variable portion of the grids 83, 85. The springs 71, 73 and washer 72 interconnect terminals 48 and 50.

Metal housing terminals 52, 54 are located interiorly of the housing 14 and partially angularly of metal connector terminals 56, 58 formed in the terminal support member 32. Terminals 52, 54 are deformed into grooves in the mating metal connector terminals 56, 58 securely fastening the terminals in the correctly calibrated position. This may be accomplished by the grooves being prefabricated and filled with solder 64. Heat is applied to a deformation tool 11, shown in FIGS. 4 and 7, transferring thermally through the terminals to the solder providing a strong structural and electrical joint which forms the connections necessary for a functioning fuel pump switch. Using the same technique, a tool 11 enters from the back of the unit to deform the insert molded housing ground strap 68 at 90 into the groove in the ground contact 70 in the terminal support member 32.

Metal housing terminal 52 is shown in FIGS. 4 and 5 in its pre-deformed condition while terminal 54 is shown already deformed. Three ports 66 are provided in the housing 14 for a tool 11 to gain access to deform the terminals 52, 54 and the insert molded housing ground strap 68 at 90. The ground strap 68 extends internally through and down the inside wall of the housing 14 all the way to the flange 24 of the housing portion 12. At its upper end 90 the strap 68 is deformed to connect with one end of the ground contact 70. At its lower end 91 the strap 68 is in contact with the metal crimp ring 25. The ground contact 70 makes contact at its other end 80 with the resistor board 42. To further enhance contact life of the switch, lower ends 60, 62 of the metal housing terminals 52, 54 are tipped and the washer 72 is laminated with silver cadmium graphite as shown in FIG. 4. To tip the ends 60, 62 another material is butt-welded to the original material. The added material will be capable of withstanding successive arcs during closed and open modes of switch operation.

A second important feature besides measuring and indicating oil pressure is provided by this transducer. Specifically, the functioning fuel pump switch, previously mentioned, is included for controlling an engine fuel pump motor in correspondence to needed oil pressure or lubrication. The fuel pump supplies fuel to an engine fuel injection apparatus. The engine probably will not start and certainly will not run long unless the fuel pump and the electric motor driving it are energized. When the engines oil pressure is zero or near zero, the engine should not start or be run and the fuel pump should be deactivated. This will prevent damage to the engines bearings and the like due to insufficient oil pressure. After operation of the engine starter motor causes the oil pressure to increase sufficiently for engine lubrication, the fuel pump may then be activated for engine starting. In accord with the aforedescribed process, the transducer and specifically the piston movement thereof, serves to operate a switch device. The complete motor energization circuit extends from a power source, such as a battery, through one of the remaining terminals 50, through terminal support member 32, specifically mating metal connector terminals 56, 58, and metal housing terminals 52, 54, through the other terminal 48 and then to the fuel pump motor.

It is thought that the improved resistor card calibration retention method and fuel pump switch of the present invention and many of its attendant advantages will be understood from the foregoing description and it will be apparent that various changes may be made in the form and construction of the components thereof without departing from the spirit and scope of the invention or sacrificing all of its material advantages, the form hereinbefore described being merely a preferred or exemplary embodiment thereof.

What is claimed is:

1. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

movable means disposed within said housing and movable in response to changes in the pressure of said pressurized fluid;

circuit means associated with said movable means for providing an electrical signal indicative of said pressure of said pressurized fluid, said circuit means including;

a first electrical contact provided on the peripheral surface of said second opening;

a terminal support member received within said second opening, said terminal support member having a second electrical contact on the peripheral surface thereof, said second electrical contact being matable with said first electrical contact; and bonding means disposed between said first and second contacts for electrically and mechanically bonding said contacts together.

2. The improved switching device of claim 1, wherein said first contact comprises:

a ground strap molded within said enclosure, said ground strap being deformably secured at one end thereof to said first contact in said terminal support member.

3. The improved switching device of claim 1, wherein said circuit means include a resistor board supported within said enclosure and said movable means includes a piston member having a contact assembly secured therewith, said contact assembly comprising a plurality of contact ends for making movable contact with said resistor board within said enclosure, each of said ends having a compound radius formed thereon whereby scratching of the surface of said resistor board is inhibited.

4. The improved switching device of claim 1, wherein said first electrical contact includes metal housing terminals, said terminals having tipped ends in contact with a metal washer.

5. The improved switching device of claim 1, wherein said bonding together of said first and second contacts locks said terminal support member in a properly calibrated position.

6. The improved switching device of claim 1, wherein said bonding means includes the use of solder.

7. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

movable means disposed within said housing and movable in response to changes in the pressure of said pressurized fluid;

circuit means associated with said movable means for providing an electrical signal indicative of said pressure of said pressurized fluid, said circuit means including;

a first electrical contact provided on the peripheral surface of said second opening;

a terminal support member received within said second opening, said terminal support member having a second electrical contact on the peripheral surface thereof, said second electrical contact being matable with said first electrical contact; and solder disposed within a groove of said second electrical contact for securing said first electrical contact to said second electrical contact by deforming said first electrical contact into said groove in said second electrical contact.

8. An improved pressure transducer and switching device operated in response to pressure changes of a fluid such as oil in an internal combustion engine, comprising:

an elongated enclosure means defining a generally hollow interior, one end of said enclosure means being adapted to receive pressurized fluid, a second opposite end of which is configured for transmitting pressure related output;

diaphragm means in said interior having a peripheral edge and a mid portion, said peripheral edge being supported by said enclosure means with said mid portion separating said enclosure interior into first and second spaces, said first space receiving pressurized fluid from said one end of said enclosure means to thereby exert a pressure force on said diaphragm, said mid portion being moved axially in said elongated enclosure in response to said pressure force;

a piston member disposed in said second space and operatively attached to said mid portion of said diaphragm and movable therewith in the axial direction of said enclosure;

a switch assembly housed in said second space of said enclosure means, said switch assembly being actuated in response to movement of said piston; and a terminal support member insertably housed in a recess of said enclosure and carrying at least one electrically conductive terminal extending axially inward into said second space in circuit with said switch assembly, said terminal support member including at least one metal connector terminal having a groove formed therein and filled with solder for deformably securing a metal housing terminal to said metal connector terminal, said metal housing terminal extending longitudinally along said interior of said enclosure means and having an opposite end in potential electrical contact with said piston member.

9. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

movable means disposed within said housing and movable in response to changes in the pressure of said pressurized fluid;

circuit means associated with said movable means for providing an electrical signal indicative of said pressure of said pressurized fluid, said circuit means including, a first electrical contact provided on the peripheral surface of said second opening;

a terminal support member received within said second opening, said terminal support member having a second electrical contact on the peripheral surface thereof, said second electrical contact being matable with said first electrical contact; and said movable means having radiused surfaces in contact with said circuit means.

10. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

a piston disposed within said housing and movable in response to changes in the pressure of said pressurized fluid;

circuit means associated with said piston for providing an electrical signal indicative of said pressure of said pressurized fluid said circuit means including, a first electrical contact provided on the peripheral surface of said second opening;

a terminal support member received within said second opening, said terminal support member having a second electrical contact on the peripheral surface thereof, said second electrical contact being matable with said first electrical contact;

said piston having electrical contacts formed with a compound radius for contacting said circuit means.

11. An improved pressure transducer and switching device operated in response to pressure changes of a fluid such as oil in an internal combustion engine, comprising:

elongated enclosure means defining a generally hollow interior, one end of said enclosure means being adapted to receive pressurized fluid, a second opposite of which is configured for transmitting pressure related output;

diaphragm means in said interior having a peripheral edge and a mid portion, said peripheral edge being supported by said enclosure means with said mid portion separating said enclosure interior into first and second spaces, said first space receiving pressurized fluid from said one end of said enclosure means to thereby exert a pressure force on said diaphragm, said mid portion being moved axially in said elongated enclosure in response to said pressure force;

a piston member disposed in said second space and operatively attached to said mid portion of said diaphragm and movable therewith in the axial direction of said enclosure;

a switch assembly housed in second space of said enclosure means, said switch assembly being actuated in response to movement of said piston; and a terminal support member insertably housed in a recess of said enclosure and carrying at least one electrically conductive terminal extending axially inward into said second space in circuit with said switch assembly; and said piston member including an electrical contact assembly attached thereto, said contact assembly having piston contacts formed with a compound radius for making slidable contact with a resistor board of said terminal support member.

12. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

movable means disposed within said housing and movable in response to changes in the pressure of said pressurized fluid;

circuit means associated with said movable means for providing an electrical signal indicative of said pressure of said pressurized fluid, said circuit means including;

a first electrical contact provided on the peripheral surface of said second opening;

a terminal support member received within said second opening, said terminal support member having a second electrical contact on the peripheral surface thereof, said second electrical contact being matable with said first electrical contact; and switch means associated with said movable means and said electrical contact on said periphery of said second opening, said switch means having tipped contacts.

13. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

movable means disposed within said housing and movable in response to changes in the pressure of said pressurized fluid;

circuit means associated with said movable means for providing an electrical signal indicative of said pressure of said pressurized fluid, said circuit means including;

a first electrical contact provided on the peripheral surface of said second opening;

a terminal support member received within said second opening, said terminal support member having a second electrical contact on the peripheral surface thereof, said second electrical contact being matable with said first electrical contact; and switch means defined by said movable means and said electrical contact on said periphery of said second opening, including at least one metal housing terminal in contact with a washer which is movable axially along a depending portion of said terminal support member, said metal housing terminal having a tipped end for contact with said washer.

14. An improved pressure transducer and switching device operated in response to pressure changes of a fluid such as oil in an internal combustion engine, comprising:

elongated enclosure means defining a generally hollow interior, one end of said enclosure means being adapted to receive pressurized fluid, a second opposite of which is configured for transmitting pressure related output;

diaphragm means in said interior having a peripheral edge and a mid portion, said peripheral edge being supported by said enclosure means with said mid portion separating said enclosure interior into first and second spaces, said first space receiving pressurized fluid from said one end of said enclosure means to thereby exert a pressure force on said diaphragm, said mid portion being moved axially in said elongated enclosure in response to said pressure force;

a piston member disposed in said second space and operatively attached to said mid portion of said diaphragm and movable therewith in the axial direction of said enclosure;

a switch assembly housed in said second space of said enclosure means, said switch assembly being actuated in response to movement of said piston; and a terminal support member insertably housed in a recess of said enclosure and carrying at least one electrically conductive terminal extending axially inward into said second space in circuit with said switch assembly; and said switch assembly including two metal housing terminals in electrical contact relationship with a metal washer, said washer being axially movable along a depending portion of said terminal support member, an end of each of said metal housing terminals is tipped for said contact with said washer and said washer is laminated with silver cadmium graphite for longer contact life with said metal housing terminal.

15. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

movable means disposed within said housing and movable in response to changes in the pressure of said pressurized fluid;

circuit means associated with said movable means for providing an electrical signal indicative of said pressure of said pressurized fluid, said circuit means including;

a first electrical contact provided on the peripheral surface of said second opening;

a terminal support member received within said second opening, said terminal support member having a second electrical contact on the peripheral surface thereof, said second electrical contact being matable with said first electrical contact;

solder disposed between said first and second contacts for electrically and mechanically bonding said contacts together and thereby locking said terminal support member in a calibrated axial position; and said first electrical contact including at least one metal housing terminal having a tipped end in contact with a metal washer, said washer axially movable along a depending portion of said terminal support member.

16. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

movable means disposed within said housing and movable in response to changes in the pressure of said pressurized fluid;

circuit means associated with said movable means for providing an electrical signal indicative of said pressure of said pressurized fluid, said circuit means including;

a first electrical contact provided on the peripheral surface of said second opening;

a terminal support member received within said second opening, said terminal support member having a second electrical contact on the peripheral surface thereof, said second electrical contact being matable with said first electrical contact;

solder disposed within a groove of said second electrical contact, so that said first electrical contact may be heated and deformably secured within said groove; and said first electrical contact including two metal housing terminals, each of said metal housing terminals having one end tipped for contact with a metal washer, said washer being axially movable along a depending portion of said terminal support member and said washer being laminated with silver cadmium graphite for longer contact life with said metal housing terminal ends.

17. An improved pressure transducer and switching device operated in response to pressure changes of a fluid such as oil in an internal combustion engine, comprising:

an elongated enclosure means defining a generally hollow interior, one end of said enclosure means having a first opening for receiving a pressurized fluid, the other end of said enclosure having a second opening, and an electrical contact provided on the periphery of said second opening;

a piston disposed within said housing and movable in response to changes in the pressure of said pressurized fluid;

circuit means associated with said movable means for providing an electrical signal indicative of said pressure of said pressurized fluid, said circuit means including;

a first electrical contact provided on the peripheral surface of said second opening;

a terminal support member received within said second opening, said terminal support member having a second electrical contact on the peripheral surface thereof, said second electrical contact being matable with said first electrical contact;

solder disposed within a groove of said second electrical contact, so that said first electrical contact may be heated and deformably secured within said groove;

said first electrical contact including two metal housing terminals, each of said metal housing terminals having one end tipped for contact with a metal washer, said washer being axially movable along a depending portion of said terminal support member and said washer being laminated with silver cadmium graphite for longer contact life with said metal housing terminal ends; and said piston having an electrical contact assembly attached thereto for slidably engaging a resistor board of said circuit means, said contact assembly having contact surfaces formed with a compound radius so as not to scratch said resistor board as said contact assembly moves axially within said elongated enclosure means.

18. A method for improving electrical contacts and for holding positive calibration for a switching device operated in response to pressure changes of a fluid such as oil in an internal combustion engine, said switching device comprising a generally hollow and elongated enclosure means defining an interior, one end of said enclosure being adapted to receive pressurized fluid, a second opposite end of which is configured for transmitting pressure related output through a terminal support member, said terminal support member being insertably and axially positioned within said interior, said terminal support member making electrical contact with said enclosure by way of metal connector terminals formed within said terminal support member and secured to metal housing terminals, said metal housing terminals being secured to said enclosure means, a ground contact partially formed within said terminal support member secured at one end to an insert molded housing ground strap contained within said enclosure means, said metal housing terminals having ends in contacting relationship with washers, said washers in contact with a piston member adapted to axially reciprocate within said interior, said method comprising the steps of:

filling a groove in each of said metal connector terminals with solder;

axially positioning said terminal support member; and deforming said metal housing terminals into respective ones of each of said grooves filled with solder.

19. The method of claim 18 wherein the deforming of said metal housing terminals is accomplished by inserting a heatable tool into ports designed for accessing said metal housing terminals then deforming said terminals with said tool while heating said solder to thereby bond said metal housing terminals with said metal connector terminals.

20. The method of claim 18 which further comprises:

filling a groove in one end of said ground contact with solder;

inserting said tool in a port to access one end of said ground strap which is near said solder filled end of said ground contact; and deforming said end of said ground strap into said groove in said ground contact while heating said solder to securely bond said ground strap to said ground contact.

* * * * *